(12) United States Patent
Muenzenberger

(10) Patent No.: US 9,145,987 B2
(45) Date of Patent: Sep. 29, 2015

(54) FIRE PROTECTION SLEEVE

(71) Applicant: Hilti Aktiengesellschaft, Schaan (LI)

(72) Inventor: Herbert Muenzenberger, Wiesbaden (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 13/933,394

(22) Filed: Jul. 2, 2013

(65) Prior Publication Data
US 2014/0007373 A1 Jan. 9, 2014

(30) Foreign Application Priority Data
Jul. 3, 2012 (DE) .................... 10 2012 211 562

(51) Int. Cl.
*E04C 2/52* (2006.01)
*F16L 5/04* (2006.01)
*A62C 2/06* (2006.01)
*F16B 15/00* (2006.01)
*H02G 3/04* (2006.01)
*H02G 3/22* (2006.01)

(52) U.S. Cl.
CPC . *F16L 5/04* (2013.01); *A62C 2/065* (2013.01); *F16B 15/0015* (2013.01); *H02G 3/0412* (2013.01); *H02G 3/22* (2013.01); *Y10T 16/063* (2015.01)

(58) Field of Classification Search
CPC ...... A62C 3/16; A62C 2/065; F16B 15/0015; F16L 5/02; F16L 5/04; H02G 3/0412; H02G 3/22

USPC .............. 52/220.8, 232; 24/31 R, 35, 36, 458
See application file for complete search history.

(56) References Cited

U.S. PATENT DOCUMENTS

| 431,175 | A | * | 7/1890 | Southwick | ........................ 24/36 |
| 742,993 | A | * | 11/1903 | Izant | ........................... 24/265 A |
| 924,355 | A | * | 6/1909 | Howard | .......................... 52/712 |
| 2,189,963 | A | * | 2/1940 | Schoeberger | .................. 24/11 F |
| 2,302,585 | A | * | 11/1942 | Stamy | ............................. 24/350 |
| 2,898,741 | A | * | 8/1959 | Milliken | ......................... 405/47 |
| 3,965,776 | A | * | 6/1976 | Wolstenholme et al. | ....... 81/486 |
| 4,333,286 | A | * | 6/1982 | Weinar | ............................ 52/281 |
| 4,400,766 | A | * | 8/1983 | Munson | ....................... 362/376 |

(Continued)

FOREIGN PATENT DOCUMENTS

DE 198 52 120 C2 3/2000
DE 102 17 174 A1 10/2003

(Continued)

OTHER PUBLICATIONS

German Search Report, dated Feb. 19, 2013, (six (6) pages).

*Primary Examiner* — Charles A Fox
*Assistant Examiner* — Joseph J Sadlon
(74) *Attorney, Agent, or Firm* — Crowell & Moring LLP

(57) ABSTRACT

A fire protection sleeve is disclosed. The fire protection sleeve has a carrier strip and an intumescent overlay, which runs on an inner surface along the carrier strip and is connected thereto. A plurality of recesses spaced apart from one another in a longitudinal direction are provided on the outer side of the carrier strip facing away from the intumescent overlay. The fire protection sleeve also has a closure clip, made in particular of a sheet, wherein the closure clip has at least two hooks that are able to engage in the recesses.

11 Claims, 3 Drawing Sheets

(56) References Cited

U.S. PATENT DOCUMENTS

| | | | | |
|---|---|---|---|---|
| 4,419,535 | A | * | 12/1983 | O'Hara .................... 174/505 |
| 4,433,732 | A | * | 2/1984 | Licht et al. .................... 169/48 |
| 4,453,471 | A | * | 6/1984 | Harrington et al. .......... 108/55.1 |
| 4,688,747 | A | * | 8/1987 | Helmsdorfer et al. .......... 248/56 |
| 4,839,223 | A | * | 6/1989 | Tschudin-Mahrer ...... 428/317.1 |
| 5,032,690 | A | * | 7/1991 | Bloom .................... 174/487 |
| 5,103,609 | A | * | 4/1992 | Thoreson et al. ................ 52/232 |
| 5,174,077 | A | * | 12/1992 | Murota .................... 52/232 |
| 5,314,064 | A | * | 5/1994 | Wells et al. .................... 206/340 |
| 5,347,767 | A | * | 9/1994 | Roth .................... 52/1 |
| 5,421,127 | A | * | 6/1995 | Stefely .................... 52/1 |
| 5,638,583 | A | * | 6/1997 | Tseng .................... 24/67.5 |
| 5,641,940 | A | * | 6/1997 | Whitehead .................... 174/483 |
| 5,876,042 | A | * | 3/1999 | Graf et al. .................... 277/627 |
| 5,887,396 | A | * | 3/1999 | Thoreson .................... 52/232 |
| 6,477,813 | B2 | * | 11/2002 | Andresen .................... 52/220.8 |
| 6,519,817 | B1 | * | 2/2003 | Lenhart et al. .................... 24/458 |
| 7,560,644 | B2 | * | 7/2009 | Ford et al. .................... 174/68.1 |
| 8,146,303 | B2 | * | 4/2012 | Gibson et al. .................... 52/177 |
| 8,178,781 | B2 | * | 5/2012 | Duffy .................... 174/70 C |
| 8,776,462 | B2 | * | 7/2014 | Foerg et al. .................... 52/232 |
| 2009/0098280 | A1 | * | 4/2009 | Tahon .................... 427/69 |
| 2011/0214371 | A1 | * | 9/2011 | Klein .................... 52/232 |
| 2012/0037762 | A1 | * | 2/2012 | Wu .................... 248/65 |
| 2013/0206018 | A1 | * | 8/2013 | Ritola .................... 100/2 |

FOREIGN PATENT DOCUMENTS

| | | | |
|---|---|---|---|
| DE | 20 2012 002 553 U1 | 6/2012 | |
| EP | 1 181 481 A1 | 2/2002 | |
| EP | 1 273 841 A1 | 1/2003 | |
| EP | 2505891 A1 * | 10/2012 | |
| GB | 2370987 A * | 7/2002 | ............... A62C 2/06 |
| GB | 2 388 174 A | 11/2003 | |
| WO | WO 00/68608 | 11/2000 | |

* cited by examiner

FIRE PROTECTION SLEEVE

This application claims the priority of German Patent Document No. DE 10 2012 211 562.5, filed Jul. 3, 2012, the disclosure of which is expressly incorporated by reference herein.

BACKGROUND AND SUMMARY OF THE INVENTION

The invention relates to a fire protection sleeve having a carrier strip and an intumescent overlay, which runs on an inner surface along the carrier strip and is connected thereto.

Fire protection sleeves are used to seal as tightly as possible breakthroughs in a wall or ceiling though which pipe or cable are fed in order to prevent the spread of fire or smoke. To this end, such a fire protection sleeve is laid around the pipe or cable on or in the breakthrough. The fire protection sleeve has a dimensionally stable carrier strip used to position the fire protection sleeve, along with an intumescent overlay that expands under the influence of heat and seals the breakthrough. The intumescent overlay may be glued or foamed on the carrier strip.

In order to make it possible to individually adapt to the number or size of pipes, cable strands, etc., present in the wall or ceiling breakthrough, fire protection sleeves are known from the prior art which are supplied as continuous material and can be cut to the desired length on site. Such a fire protection sleeve is known from European Patent Document No. EP 1 181 481 B1, for example.

In order to facilitate the assembly of the fire protection sleeve on site, integrated closure elements are provided on the carrier strip, for example, which make it possible to close the fire protection sleeve. Alternatively or additionally, hooks are provided on the wall or ceiling into which the protection sleeve can be inserted and thereby be fixed firmly in position.

These types of closure or anchoring systems are supposed to ensure a secure fixation and anchoring of the fire protection sleeve so that it is not able to shift, something that could affect functioning. In addition, the expansion of the intumescent material in the event of a fire is supposed to be impeded as little as possible so that a complete and quick sealing of the breakthrough is possible. In addition, the fire protection sleeve is supposed to be simple to cut to size so that quick processing is possible at the construction site.

However, manufacturing the carrier strip and thus the fire protection sleeve becomes substantially more expensive due to the closure elements that are integrated into the carrier strip. In addition, the carrier strip cannot be shortened as desired. Additional anchoring elements can only be used if the fire protection sleeve is inserted into the breakthrough.

The object of the invention is providing a fire protection sleeve which makes a simple closing of the fire protection sleeve possible independent of the desired diameter or the desired length of the fire protection sleeve.

To attain this object, a fire protection sleeve is provided having a carrier strip, an intumescent overlay, which runs on an inner surface along the carrier strip and is connected thereto, wherein a plurality of recesses spaced apart from one another in a longitudinal direction are provided on the outer side of the carrier strip facing away from the intumescent overlay, and having in particular a closure clip made of a sheet, which has at least two hooks that are able to engage in the recesses. The shape of the recess is not restricted. The recesses may be configured, for example, in the form of slots or holes, wherein other shapes are also conceivable and possible, however.

Because only recesses are provided on the carrier strip, it is simple to manufacture and, because there are no projecting elements, it can be wound up to save space. The carrier strip with the intumescent overlay fastened to it can be cut to the desired dimension and rolled up. Then a closure clip is inserted from the outside into the openings and the fire protection sleeve is thereby closed.

The advantage of this as compared to other closure possibilities is that the carrier strip is loaded exclusively in the circumferential direction when the intumescent overlay expands, i.e., only tensile stress acts on the carrier strip. Shearing stress, which may occur particularly in the region of the closure, is absorbed completely by the clip. As a result, it is possible to manufacture the carrier strip from a thinner material. The advantage of this is that the carrier strip is considerably more flexible and trimming the carrier strip to the desired length is considerably simpler. The carrier strip can be manufactured so thin for example that previously used cutting zones with a material weakening are no longer required, thereby allowing manufacturing expenses for the carrier strip to be reduced as well. In addition, a more precise adaptation of the fire protection sleeve is possible because the carrier strip is able to be cut at any position independent of cutting zones.

The closure clip preferably has a substantially flat base body, and, in a pre-assembly position, the hooks protrude substantially at a right angle from the base body. As a result, the hooks are able to be inserted into the recesses in the radial direction and be fixed to the strip. After insertion of the closure clip, the base body lies flat on the carrier strip so that the base body does not project at all or only slightly over the fire protection sleeve or the carrier strip. This facilitates in particular the insertion of the fire protection sleeve into a breakthrough, because there are no projections on the outside which might cause the fire protection sleeve to get caught.

The hooks are bent, for example, in a final assembly position at an acute angle to the base body and in particular in the final assembly position are bent approximately parallel to the base body. After insertion into the recesses, the hooks are thus bent in such a way that they are not able to slip out of the recesses. This would only be possible if the edges of the carrier strip were slid on top of one another so that the distance between the recesses in which the hooks engage was shortened. However, this is prevented by the carrier strip and the intumescent overlay. If the intumescent overlay expands, the stress on the closure clip also increases, thereby additionally securing it.

In order to be able to bend the hooks as simply as possible, the hooks preferably have an especially elongated receptacle for a tool. This facilitates the bending of the hooks into the intermediate assembly position, in which the hooks are inserted into the recesses and thus are not accessible from the outside. The tool may be inserted radially into the round strip and in the longitudinal direction into the receptacle so that the tool is held at the respective hook in the longitudinal direction. By swiveling the tool, the hook is able to be bent in a simple manner. The tool may be a common tool, such as a screwdriver, a pair of scissors, or a tool with a flat and wide element that is able to engage in the receptacles.

The receptacle runs, for example, parallel to the plane of the hook. In particular, the receptacle forms a pocket with opposing edges of the hook that are bent toward each other. This pocket or receptacle is configured, for example, such that a tool, e.g., a screwdriver, is able to be inserted into the closure clip or the receptacle in the radial direction. Then the tool may be moved in such a way that the hook is bent into the final assembly position, wherein the tool is finally swiveled approximately tangentially to the carrier strip. Finally, the tool may be extracted from the pocket. The pocket may be embodied in such a way that damage by the tool to the intumescent material underneath is ruled out, because the pocket is tapered or closed, for example, towards the free end.

In an alternative embodiment of the closure clip, the tool may be connected permanently or detachably to the hooks and/or the receptacle for bending the hooks of the closure clip. It is preferred that the tool be configured as an elongated, rectangular sheet, which, in a pre-assembly form, projects over the plane of the closure and is connected permanently or detachably to the hooks and/or the receptacle.

In order to facilitate simple movement of the hooks into the final assembly position, it is necessary that the bending does not encounter any great resistance from the intumescent overlay in the region of the hooks. This may be accomplished, for example, by the intumescent overlay being made of a yielding foam material at least in the region of the recesses, which may be displaced or compressed simply. In this case, "yielding" means that the material is soft and elastic so that it is able to be bent and deformed without a great expenditure of force and is able to return to its original shape again if deformation forces are no longer acting on the material.

However, it is also conceivable for the intumescent overlay to have, in the region of the recesses, depressions pointing towards the carrier strip, or grooves running in particular in the longitudinal direction. In the region in which the hooks may engage, no intumescent overlay is thus provided or a groove or depression is formed so that the hook does not come into contact with the intumescent overlay and therefore the intumescent overlay does not constitute an impediment to bending.

These grooves may also extend through the entire thickness of the intumescent overlay and divide the same into a plurality of intumescent strips in the longitudinal direction. As a result, the hook or the closure clip is also accessible from the inside so that it may also be bent from the inside.

The intumescent overlay preferably has ribs running transverse to the longitudinal direction. The ribs extend over the entire width of the intumescent overlay. The ribs, for one, define cutting regions, which are used to make it simple to cut the carrier strip or the intumescent overlay to length. In addition, the ribs may also form fold regions, however, which facilitate simple rolling of the sleeve. If the ribs were not present, the intumescent overlay would get heavily compressed on the inner side when it is rolled around the pipe or line especially in the case of smaller pipe diameters. The ribs prevent this. The size of the ribs or the angle between the ribs may be selected depending upon the maximum or desired diameter of the fire protection sleeve.

As the case may be, gaps present between the ribs are closed in the event of a fire by the expansion of the intumescent overlay.

The recesses are preferably located between the ribs, which facilitates the insertion of the hooks.

The expansion of the intumescent overlay is impeded by the carrier strip. In order to make it possible to better seal the wall breakthrough, a second intumescent overlay may therefore be provided on the outer side of the carrier strip. This may furthermore form a vibration decoupling of the line or the pipe from the substrate. This second intumescent overlay is preferably formed of strips and laid in such a way that recesses in the carrier strip are kept clear so that the closure clip may be inserted.

Normally, a metal strip, especially a metal sheet, is used for the carrier strip. However, it is also conceivable for the carrier strip to be made of plastic, in particular a glass fiber reinforced plastic.

Additional advantages and features are disclosed in the following description in conjunction with the drawings.

DETAILED DESCRIPTION OF THE DRAWINGS

Figure 1:
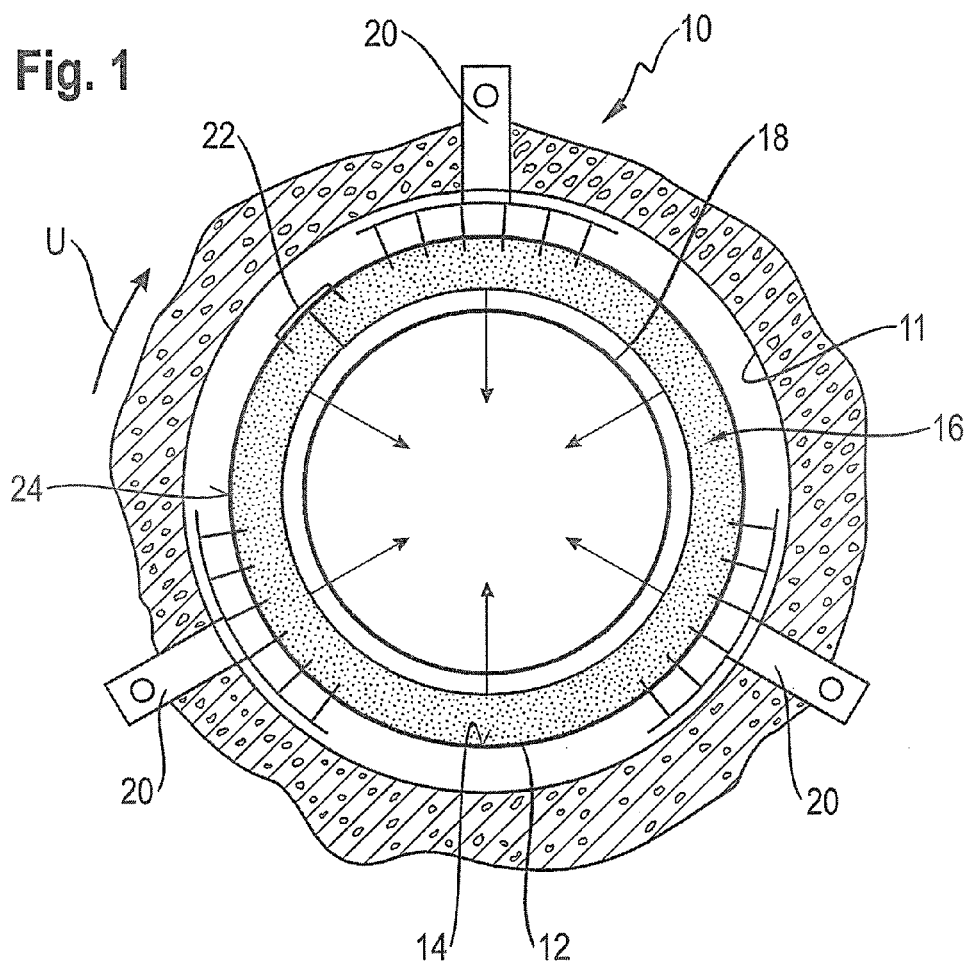
FIG. 1 is a schematic representation of a fire protection sleeve according to the invention.

FIG. 1 shows a fire protection sleeve 10 for sealing a breakthrough 11 in a wall or a ceiling. The fire protection sleeve 10 has a continuous carrier strip 12 in the circumferential direction U, which is manufactured from a metal sheet or plastic, for example, a glass fiber reinforced plastic. An intumescent overlay 16 is fastened on the inner surface 14 of the carrier strip 12. The intumescent overlay 16 is, for example, glued or foamed on, but it may also be fastened on the carrier strip 12 in another manner.

Figure 2A:
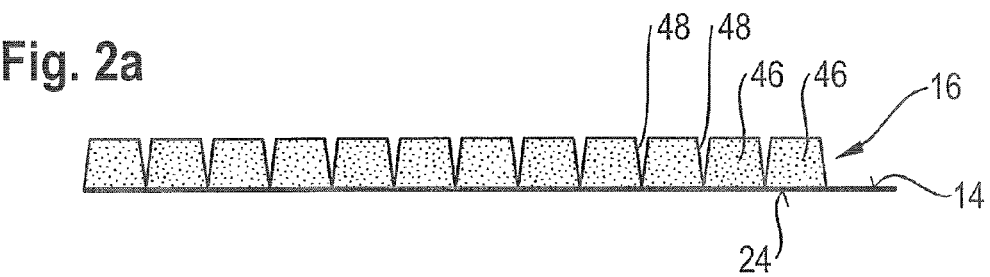
FIGS. 2a and 2b are a side view and a perspective view, respectively, of a carrier strip with an intumescent overlay fastened thereto for producing the fire protection sleeve from FIG. 1.
Figure 2B:
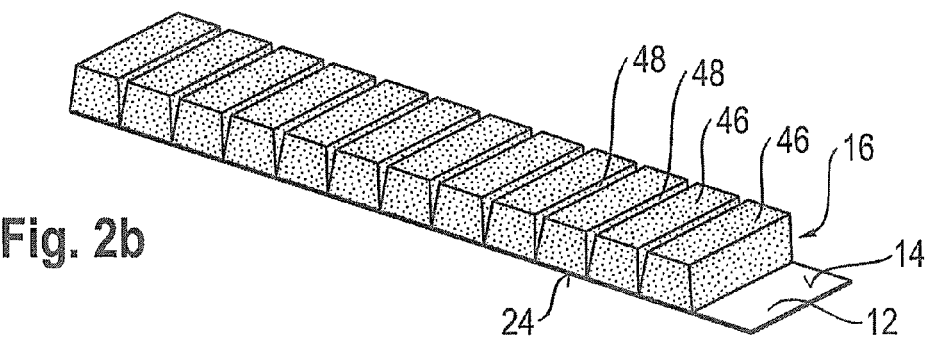

The carrier strip 12 with the intumescent overlay 16 fastened thereto is produced from a continuous material as depicted schematically in FIGS. 2a and 2b. The carrier strip 12 is supplied with the intumescent overlay 16 fastened to it and cut to the desired length on site.

Then the carrier strip 12 with the intumescent overlay 16 is wrapped around a pipe 18 or a line and fastened on or in the breakthrough 11. Holding means 20 are provided for fastening on the breakthrough 11, which engage on the outer circumference of the carrier strip 12 and may be fastened to the wall or ceiling.

If a great amount of heat is generated, for example because of a fire, the intumescent overlay 16 expands. As a result, the breakthrough 11 is tightly sealed so that smoke or fire is prevented from passing through the breakthrough 11.

Figure 3:
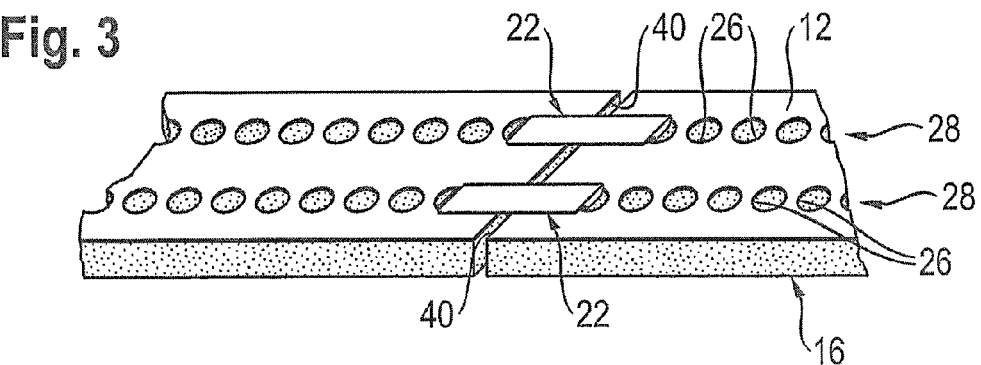
FIG. 3 illustrates the closure region of the fire protection sleeve from FIG. 1.

The carrier strip 12 is closed in the circumferential direction U by one or more closure clips 22 (also see FIG. 3).

A plurality of slot-shaped recesses 26 spaced apart in the longitudinal direction L are provided for this purpose on the radial outer surface 24 of the carrier strip 12, in which recesses the closure clip 22 may engage, as described in the following. In the exemplary embodiment shown here two parallel running rows 28 are provided with recesses 26, wherein a closure clip 22 is provided for each row 28. However, embodiments having only one closure clip 22, i.e., only one row 28 of recesses, are possible or a plurality of rows 28 if the fire protection sleeve is supposed to protect a longer pipe segment.

Figure 4A:
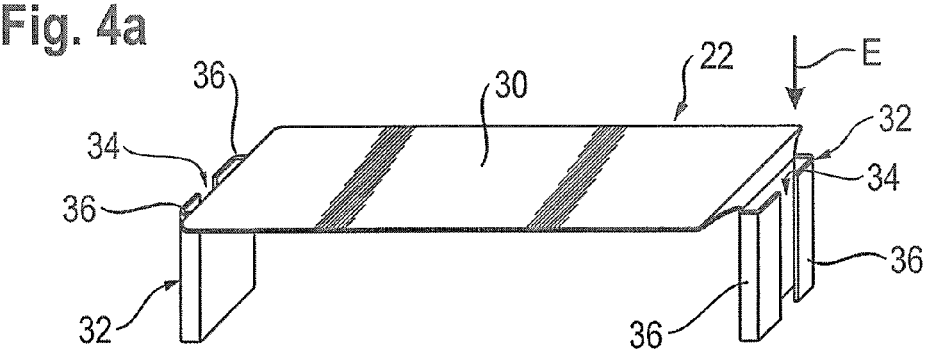
FIGS. 4a to 4c illustrate the closure clip of the fire protection sleeve from FIG. 1 in different assembly positions.

The closure clip 22 is formed, for example, of a metal sheet and has a substantially flat base body 30. A hook 32 is provided on each longitudinal end of the base body 30, which in the pre-assembly position shown in FIG. 4a protrudes substantially at a right angle from the base body 30.

Figure 4B:
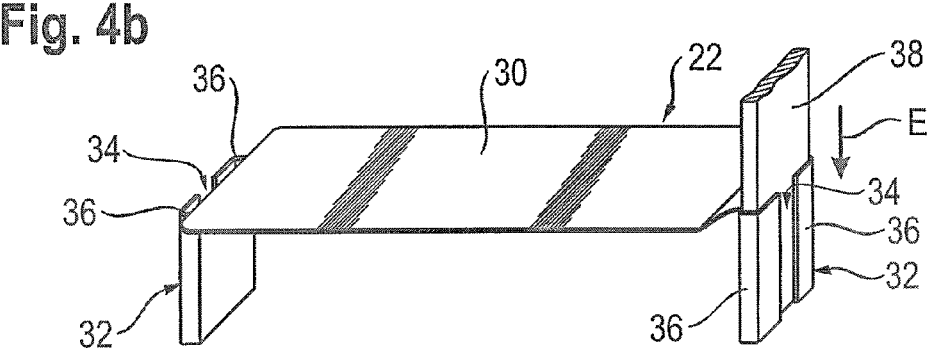

Provided on each hook 32 is an elongated receptacle 34, which is formed by the opposing edges 36 of the hook 32, which are bent towards each other and therefore form a pocket that is open in the longitudinal direction. A flat tool 38, for example a screwdriver, may be inserted into the pocket in an insertion direction E (FIG. 4b).

After the carrier strip 12 with the intumescent overlay 16 has been placed around the pipe 18, the closure clip 22 with the hooks 32 in the radial direction is placed on the carrier strip in such a way that the hooks 32 project into two recesses 26.

Figure 4C:
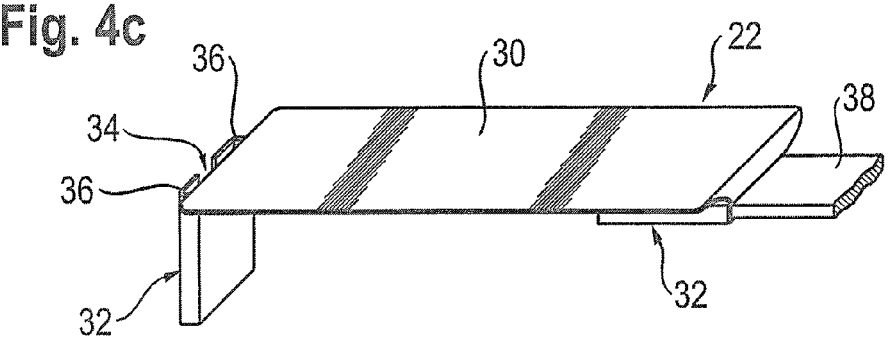

After insertion of the hooks 32 into the recesses 26 of the carrier strip 12, the hooks 32 are bent towards each other by swiveling the tool 38 in such a way that they run at an acute angle to the base body and in a final assembly position (FIG. 4c) are bent approximately parallel to the base body 30.

If both hooks 32 are bent towards each other, the carrier strip is closed securely. Opening the carrier strip 12 would only be possible if the hooks 32 were bent open or the edges 40 of the carrier strip 12 were moved towards each other so that the hooks 32 were able to slip out of the recesses 26. This is not possible, however, because the edges 40 fit snugly against each other or a displacement also from the intumescent overlay 16 is prevented.

Therefore, the fire protection sleeve 10 is closed securely in the circumferential direction by closure clip 22.

If the intumescent overlay 16 expands due to the generation of a lot of heat, the carrier strip is pressed radially outwardly by the intumescent overlay and stressed in the circumferential direction U. The carrier strip is thus subject to tension in the circumferential direction U. Shearing stress from this expansion acts only the closure clip 22. Thus, the carrier strip 12 is able to be dimensioned considerably thinner.

The advantage of this is that the material for the carrier strip 12 may be selected to be so thin that it is possible to cut the carrier strip 12 to the desired length using simple means. No additional weakened zones or cutting zones need to be provided in the carrier strip 12.

In order to facilitate simple bending of the hooks 32 of the closure clip 22, it is necessary that the bending of the hooks does not encounter any great resistance from the intumescent overlay.

Figure 5:
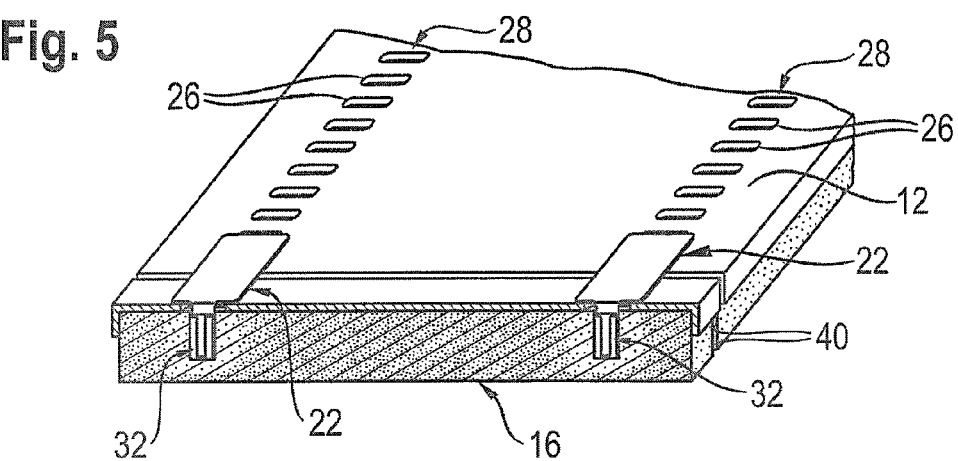
FIG. 5 is a perspective view of a first embodiment of a fire protection sleeve according to the invention.

This may be achieved, for example, by the intumescent overlay 16 being made at least in the region of the recesses 26 of a flexibly yielding foam material, which is able to be displaced or compressed in a simple manner by the hooks (FIG. 5).

Figure 6:
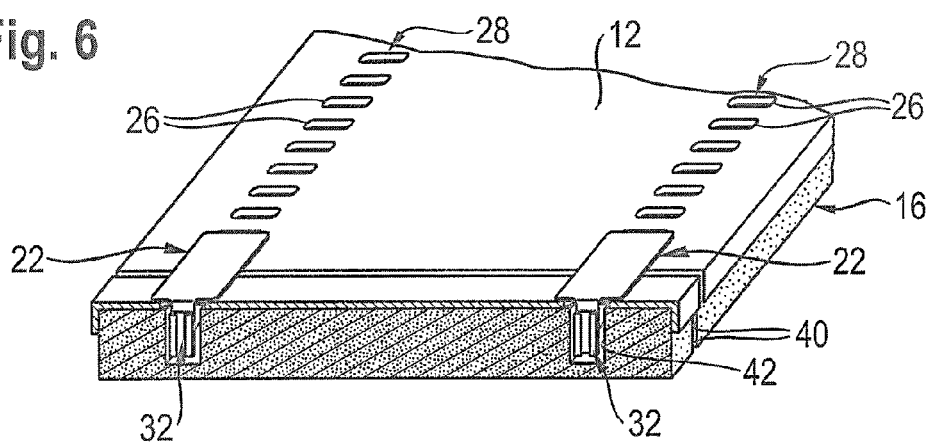
FIG. 6 is a perspective view of a second embodiment of a fire protection sleeve according to the invention.

Alternatively, however, grooves 42 may also be provided in the intumescent overlay 16, which point toward the carrier strip 12 so that no intumescent overlay is present in the engagement region of the closure clip 22 or the hooks 32 (FIG. 6). Instead of grooves, depressions may also be provided at selected points on each recess.

Figure 7:
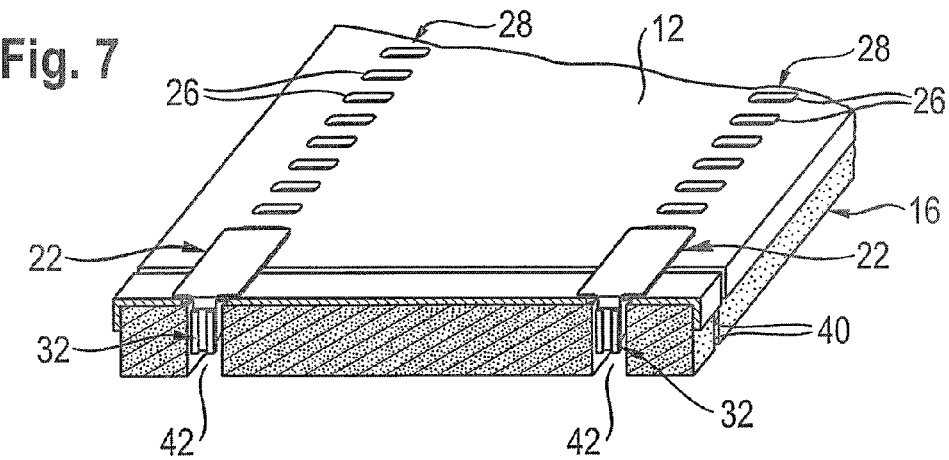
FIG. 7 is a perspective view of a third embodiment of a fire protection sleeve according to the invention.

In the embodiment depicted in FIG. 7, the grooves 42 extend in the radial direction through the entire intumescent overlay 16 so that the hooks 32 are also accessible from inside.

Because the intumescent overlay expands greatly when heat develops, such grooves 42 or depressions are sealed in the event of a fire so that the function of the fire protection sleeve is ensured. The intumescent overlay swells around the strip 12 so that the intumescent overlay seals the entire gap.

Figure 8:
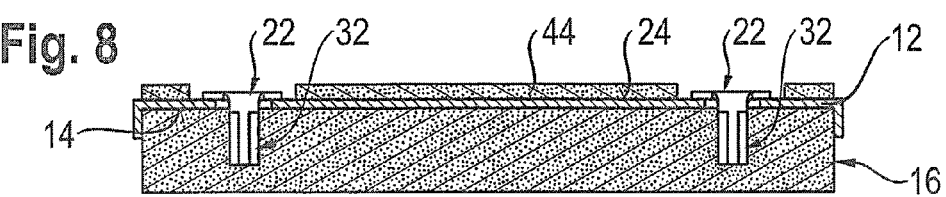
FIG. 8 is a cross-section through a fourth embodiment of a fire protection sleeve according to the invention.

The carrier strip 12 impedes the outward expansion of the intumescent overlay 16 more or less strongly. A second intumescent overlay 44 may be provided on the outer side of the carrier strip 12 (FIG. 8). The second intumescent overlay is able to expand better radially outwardly and thus ensure a further reliable seal of the breakthrough 11 outside of the carrier strip. In the case of this intumescent overlay, it must be ensured that the recesses 26 are kept clear so that it is possible to simply insert the closure clip 22.

As FIGS. 2a and 2b show, the intumescent overlay 16 is divided in the longitudinal direction into a plurality of ribs 46 running transverse to the longitudinal direction. Gaps 48 extending up to the carrier strip 12 are provided between the ribs 46. The recesses 26 are located in the region of the gaps 48.

The ribs 46 make it possible to simply roll up the carrier strip 12 with the intumescent overlay 16 fastened thereon. If these ribs were not present, the material of the intumescent overlay 16 would get compressed when it is rolled up, which would make it more difficult to roll up the fire protection sleeve 10.

The gaps 48 between the ribs 46 are preferably configured such that they close when the carrier strip 12 is rolled around the pipe 18 or the line, i.e., adjacent ribs 46 fit snugly together. Interstices that are present between the ribs 46 are sealed by the expanding material of the intumescent overlay 16.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fire protection sleeve, comprising:
   a carrier strip, wherein the carrier strip includes a plurality of recesses spaced apart from one another in a longitudinal direction;
   an intumescent overlay disposed on an inner surface of the carrier strip; and
   a closure clip, wherein the closure clip has a base body and at least two hooks that are engagable in the recesses, wherein a respective receptacle for a tool is provided on each of the at least two hooks, and wherein the respective receptacle is formed by opposing edges of the respective hook which are bent towards each other and which form a pocket that is open in the longitudinal direction.

2. The fire protection sleeve according to claim 1, wherein the base body of the closure clip is a substantially flat base body and wherein, in a pre-assembly position, the hooks protrude substantially at a right angle from the base body.

3. The fire protection sleeve according to claim 1, wherein the base body of the closure clip is a substantially flat base body and wherein, in a final assembly position, the hooks are bent at an acute angle to the base body.

4. The fire protection sleeve according to claim 1, wherein the base body of the closure clip is a substantially flat base body and wherein, in a final assembly position, the hooks are bent approximately parallel to the base body.

5. The fire protection sleeve according to claim 1, wherein the receptacle runs parallel to a plane of the hook.

6. The fire protection sleeve according to claim 1, wherein the intumescent overlay is a yielding foam material at least in a region of the recesses.

7. The fire protection sleeve according to claim 1, wherein the intumescent overlay has at least one groove in a region of the recesses.

8. The fire protection sleeve according to claim 7, wherein the at least one groove extends through an entire thickness of the intumescent overlay and divides the intumescent overlay into a plurality of intumescent strips.

9. The fire protection sleeve according to claim 1, wherein the intumescent overlay has gaps running transverse to the longitudinal direction which define ribs therebetween.

10. The fire protection sleeve according to claim 1, further comprising a second intumescent overlay disposed on an outer surface of the carrier strip.

11. The fire protection sleeve according to claim 1, wherein the carrier strip is made of a metal or a plastic.

\* \* \* \* \*